Patented June 17, 1947

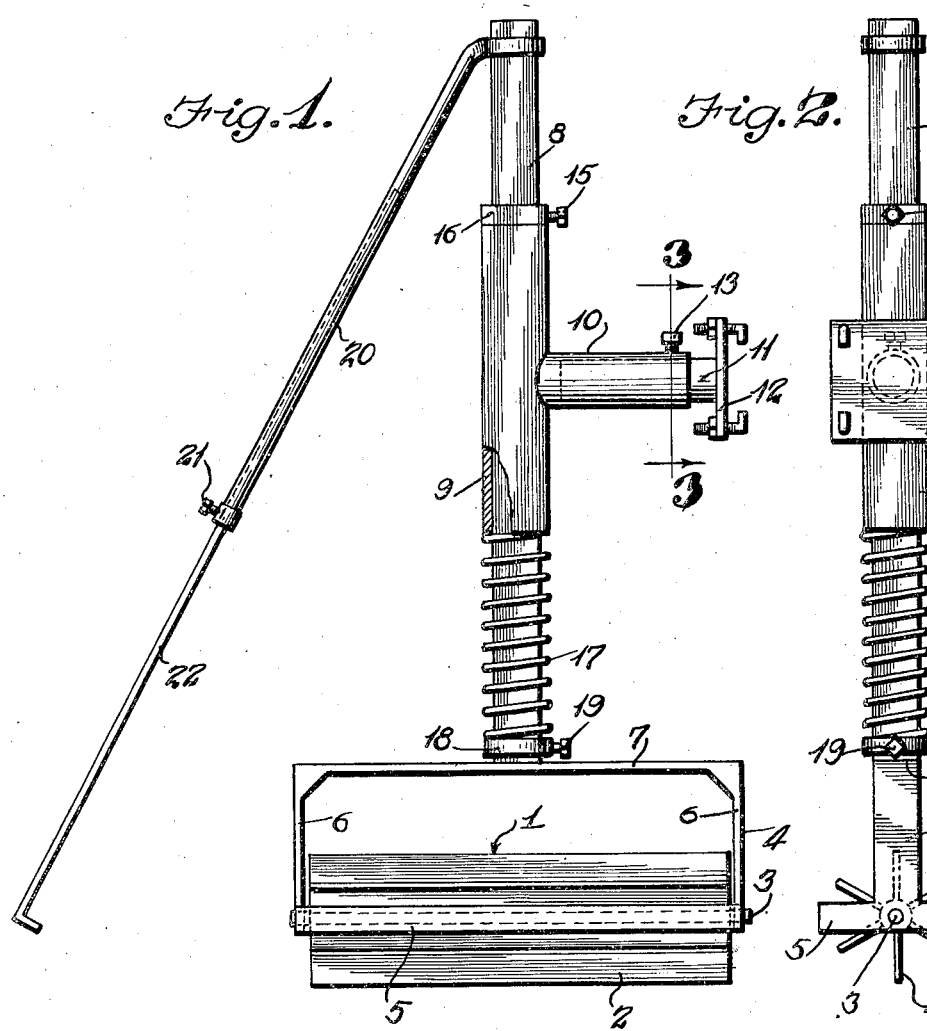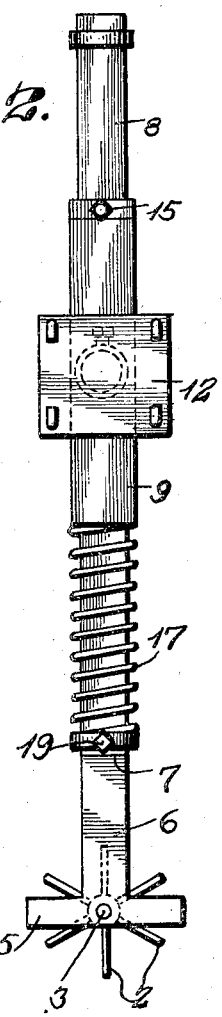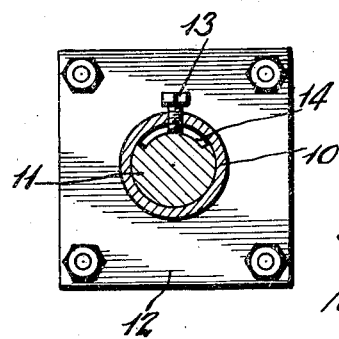

2,422,409

UNITED STATES PATENT OFFICE 2,422,409

STALK CUTTER

William H. Greenroyd, Carey, Tex.

Application August 17, 1945, Serial No. 611,047

4 Claims. (Cl. 55—61)

This invention relates to farming equipment, and more particularly to a stalk-cutting attachment for farm tractors.

A main object of the invention is to provide a novel and improved stalk-cutting attachment for a tractor which is of simple construction, which is efficient in operation and which may be adjusted for securement to a wide range of different designs of tractors.

A further object of the invention is to provide a stalk-cutting attachment which may be readily secured to a tractor for cutting the stalks alongside the tractor while the tractor is performing a plowing operation on a field being prepared for planting.

Further objects and advantages of the invention will appear from the following description and claims, and from the accompanying drawings, wherein:

Figure 1 is a front elevational view of a stalk-cutting attachment according to this invention.

Figure 2 is an end elevational view of the attachment of Figure 1.

Figure 3 is a cross-sectional view taken on line 3—3 of Figure 1.

Referring to the drawings, 1 designates a cutter wheel, which comprises an elongated tube or pipe to which is integrally secured a plurality of radial blades 2. Cutter wheel 1 is journaled on a shaft 3 secured in a frame 4, said frame comprising a horizontal rectangular guard portion 5 carried by a pair of depending legs 6, 6 integrally secured to a horizontal bar member 7. Bar member 7 is centrally secured to an upwardly extending shaft member 8. Slidably engaged with shaft member 8 is a sleeve member 9 formed with a horizontal tubular arm 10. Received telescopically in arm 10 is a horizontal shaft member 11 carried by a bracket plate 12 adapted to be clamped to a longitudinal frame element of the tractor. Arm 10 is provided with a set screw 13 extending into a peripheral groove 14 formed in shaft member 11 for adjustably securing sleeve 9 in a desired vertically inclined angular position with respect to the tractor.

Adjustably clamped to the upper portion of shaft member 8 by a set screw 15 is a collar 16 which transmits the weight of the shaft member and cutter wheel assembly to sleeve member 9. The shaft member 8 and the cutter wheel assembly carried thereby is biased downwardly by a coil spring 17 which bears between the lower edge of sleeve member 9 and a collar 18 adjustably secured to shaft member 8 by a set screw 19. Spring 17 provides a cushioning means for permitting the cutter wheel assembly to be moved upwardly without damage thereto while the cutter wheel is traversing bumpy and uneven ground.

Secured to the upper end of shaft member 8 is an inclined tubular bracket member 20 adjustably secured by a set screw 21 to a rod member 22 telescopically received therein, the lower end of rod member 22 being connected to the hydraulic lift device of the tractor for raising the cutter wheel assembly to an inoperative position as required.

In operation, the cutter wheel traverses the ground alongside the tractor during the plowing operation, so that the residual stalks are cut simultaneously with the plowing of the soil row adjacent thereto. A cutter wheel attachment may be secured to each side of the tractor for simultaneously cutting two rows of stalks if desired.

The cushioning action of spring 17 allows the cutter wheel to closely follow the contour of the ground, thus providing an efficient stalk-cutting action.

Shaft member 8 and sleeve member 9 may be keyed or splined together to prevent relative rotation therebetween or may be made non-circular or square in cross-section to provide the required keying together of said shaft member and sleeve member.

While a specific embodiment of a stalk-cutting attachment for tractors has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A stalk-cutting attachment for a tractor comprising a sleeve member, a horizontal tubular arm projecting at right angles to said sleeve member, a clamping plate member adapted to be secured to the frame of the tractor, a projection on said plate member received in said tubular arm, a setscrew in said arm cooperating with said projection to secure the sleeve member in a desired angular position with respect to the tractor, a shaft slidably mounted in said sleeve member, a stop member on the upper portion of said shaft adapted to bear on the upper edge of said sleeve member, stop means on the lower portion of said shaft, a cutter wheel assembly carried by the lower end of said shaft, and a coiled spring encircling said shaft and bearing between said lower stop means and the lower edge of said sleeve member.

2. The structure of claim 1, and wherein said upper stop member and said lower stop means are adjustable in position along the length of said shaft.

3. The structure of claim 1, and wherein the upper portion of said shaft carries a downwardly extending adjustable rod member adapted to be connected to the hydraulic lift device of the tractor.

4. A stalk-cutting attachment for tractors comprising a sleeve member, a tubular arm projecting at right angles to said sleeve member, means for adjustably clamping said arm to the frame of the tractor, a shaft slidably mounted in said sleeve member, a stop-member on the upper portion of said shaft adapted to bear on the upper edge of said sleeve member, stop-means on the lower portion of said shaft, a cutter-wheel assembly carried by the lower end of said shaft, and a coil spring encircling said shaft and bearing between said lower stop means on said shaft and the lower edge of said sleeve member, said adjustable clamping means comprising a projection secured to the tractor frame and extending into said arm, and a set screw in said arm cooperating with said projection to secure said sleeve member in a desired angular position with respect to the tractor.

WILLIAM H. GREENROYD.

REFERENCES CITED

The following references are of record in the file of this patent:

UNITED STATES PATENTS

| Number | Name | Date |
|---|---|---|
| 2,308,281 | Green | Jan. 12, 1943 |
| 2,052,114 | Sanders | Aug. 25, 1936 |